United States Patent [19]

Zagyvai et al.

[11] Patent Number: 4,675,114

[45] Date of Patent: Jun. 23, 1987

[54] PROCESS FOR DEWATERING MUNICIPAL AND OTHER SEWAGE SLUDGES

[75] Inventors: István Zagyvai; András Gál, both of Budapest, Hungary; József Mérai, Sulzbach; Dániel Szamosi, Bingen, both of Fed. Rep. of Germany

[73] Assignee: "Licencia" Talalmanyokat Ertekesito Es Innovacios Kulkereskedelmi Vallalat, Budapest, Hungary

[21] Appl. No.: 797,676

[22] PCT Filed: Mar. 6, 1985

[86] PCT No.: PCT/HU85/00014

§ 371 Date: Nov. 1, 1985

§ 102(e) Date: Nov. 1, 1985

[87] PCT Pub. No.: WO85/03927

PCT Pub. Date: Sep. 12, 1985

[30] Foreign Application Priority Data

Mar. 7, 1984 [HU] Hungary .................. 900/84

[51] Int. Cl.$^4$ .................................. C02F 11/14
[52] U.S. Cl. ............................. 210/666; 210/667; 210/725; 210/727; 210/734
[58] Field of Search .............. 210/609, 702, 666, 667, 210/710, 724, 725, 727, 728, 735, 751, 734

[56] References Cited

U.S. PATENT DOCUMENTS

| | | | |
|---|---|---|---|
| 1,999,973 | 4/1935 | Genter | 210/609 |
| 3,976,465 | 8/1976 | O'Donnell | 210/764 |
| 4,057,392 | 11/1977 | O'Donnell | 210/197 |
| 4,081,366 | 3/1978 | O'Donnell | 210/725 |
| 4,417,976 | 11/1983 | Sander et al. | 210/725 |

FOREIGN PATENT DOCUMENTS

| | | |
|---|---|---|
| 2232698 | 1/1974 | Fed. Rep. of Germany . |
| 2337337 | 2/1974 | Fed. Rep. of Germany . |
| 155162 | 5/1982 | German Democratic Rep. . |
| 53-113161 | 10/1978 | Japan .................. 210/609 |
| 57-156100 | 9/1982 | Japan .................. 210/609 |
| 58-52000 | 3/1983 | Japan .................. 210/609 |
| 1391142 | 4/1975 | United Kingdom . |

*Primary Examiner*—Peter Hruskoci
*Attorney, Agent, or Firm*—Karl F. Ross; Herbert Dubno; Jonathan Myers

[57] ABSTRACT

The invention relates to a new process for dewatering the sludges arising from the aerobic and/or anaerobic decomposition of e.g. household sewages, by treating with chemical agents, which comprises adjusting the pH of the sludge to a value between 9 and 12 by adding at least one of a compound selected from the group consisting of calcium and magnesium hydroxide and calcium and magnesium oxide, then mixing 50 to 5000 g./m$^3$, of formaldehyde and/or dimethylolurea to the sludge suitably in the form of an aqueous solution, then optionally adding a dusty or granular substance capable of adsorbing oils and fats in an amount of 0.5 to 15% by weight as calculated for the dry substance content of the sludge, and adding prior to the adjustment of the pH or after the optional treatment with said substance capable of adsorption to the sludge 20 to 500 g./m$^3$. of a flocculating agent, suitably a nonionic or cationic polymer with a molecular weight suitably higher than 100,000, preferably higher than 2 millions to 3 millions, or a copolymeric electrolyte containing anionic and cationic groups, suitably in the form of an aqueous solution of 0.5 to 1% by weight, then letting settle, removing the water from above the sediment and subjecting the sediment to further dewatering in a manner known in the art, suitably by the means of filtration and/or centrifuging.

16 Claims, No Drawings

PROCESS FOR DEWATERING MUNICIPAL AND OTHER SEWAGE SLUDGES

BACKGROUND OF THE INVENTION

This invention relates to a new process for dewatering municipal and other sewage sludges containing fat-type and proteinic organic contaminants, and for separating, respectively, the solid particles of such sludges from the aqueous phase.

At present, the sewage arising mostly from households, from commercial kitchens as well as from the milk industry and other plants of the food industry, which contain mainly carbohydrates, fats and proteins as organic contaminations, are usually treated in such a way that the sewage led through a coarse lattice-type filter is first introduced to a grinding or stamp mill, then the lumpy and in general inorganic solid materials are separated by leading through a so-called sand-trapping settler in order to purify the sewage and optionally to utilize the organic solid particles. Then, the thus pretreated sewage is subjected to a biological decomposition in an aerating reactor under aerobic conditions. This process can usually be accomplished within a few (6 to 12) hours when the adequate temperature and oxygen amount is provided. Subsequently, two routes of purifying can be used. According to one of the common methods, the sludge is led into a settling tank, where as coagulating agents iron chloride, iron sulphate, aluminium sulphate and other inorganic chemicals, such as caustic lime are added for preparing the dewatering of the sludge in vacuum filters and filter presses. Under the effect of these agents, the settled slurry may further be dewatered on appropriate filters, while the water may be discharged.

According to the other common method, after having been decomposed biologically in the aerating reactors, the sludge is led into a settling tank, where the solid particles are settled, the water made free of those is discharged and the slurry obtained in the settling tanks is led into closed, large-sized vessels, usually of several thousands cubic meter volume, where it is digested (decomposed) with the exclusion of atmospheric oxygen, optionally under an inert gas, under anaerobic conditions at 30° to 35° C. for a longer time, e.g. for 30 days, or at 50° to 52° C. for a shorter period, e.g. for 10 to 12 days, that is the sludge is subjected to a further, anaerobic biological decomposition. During the anaerobic digesting (decomposition) a methane-containing gas, the so-called biogas is evolved which may be utilized on one part for maintaining the temperature of the digesting system and on the other part eventually for other purposes.

In the case of a discontinuous plant operation, one cycle of the anaerobic decomposition (putrescence) proceeds within about 30 days. However, under plant conditions the process is usually accomplished halfperiodically, in a continuous cycle in such a way that an amount of the putrefied sludge adequate to a defined part of the reactor volume (e.g. 1/30) is daily taken off from the large-sized digesting reactor and the same volume of a fresh sludge is fed into the reactor. The dry substance content of the digested sludge taken off is generally between 3% and 6%, usually about 4%. This sludge is treated with flocculating agents, then led onto filters or other dewatering apparatuses and dewatered to the greatest possible extent.

The up-to-date methods described above for treating sewage sludges are summarized e.g. in the book of I. S. Turovski titled "The Treatment of Sewage Sludges" [Müsazaki Könyvkiadó (Technical Publishing House), Budapest, 1980].

The most critical step in the processes, mentioned above for working up sludges, is the dewatering which can only be realized by using power-demanding mechanical equipment and a high time-input with a low efficiency. Thus, the water content of the filter-cake can only be lowered to 75 to 80% by using band filters with possibly slow operation, that is, with a long cycle-time, while by using a filter press the water content cannot be reduced to a level lower than 65%, even with a filter performance of 5 to 6 kg/m$^2$.hour.

SUMMARY OF THE INVENTION

The object of the invention is to eliminate these disadvantages. The invention is based on the recognition that the biologically decomposed sludge form a very complicated physical and chemical system, wherein a part of the materials to be removed is present in a real solution, while another part exists in the form of an emulsion or in a colloidal state. In addition, the sludge also contains a large amount of living organisms having a high water content. In conclusion, the water content of the system is present as: (1) fluid phase where dispersion occurs; (2) capillary water; (3) solvate water; (4) structural water in the bodies of the living microorganisms of sludge and in the cells and intercellular spaces of the undecomposed organic materials. In addition to the organic salts, the sewage sludges subjected to aerobic and mainly anaerobic decomposition (digesting) contain waxes (which are not decomposed by anaerobic bacteria), fatty substances and proteins, both of high molecular weight, which usually have a colloidal dimension, great surface and are in solution in an emulgeated form binding a high amount of water. The dewatering is made difficult by these organic contaminants.

DETAILED DESCRIPTION OF THE INVENTION

Now, it has been recognized that these components of the sewage sludge contain a number of chemically reactive groups capable to react and to be bound with appropriate chemicals in such a way that the surface properties, emulsifiability and water binding capacity are modified resulting in better separability, whereby the particles of organic materials can simply and effectively be removed from the aqueous medium. Furtheron, it has been recognized that formaldehyde and dimethylolurea are particularly suitable chemical reagents for this purpose: these agents go into reaction with the above-mentioned organic contaminants of high molecular weight (that is, with waxes, fatty substances and proteins) remaining in the sludge previously subjected to an aerobic and/or anaerobic decomposition. The above chemical agents also form bridge-type bonds, whereby a great part of the emulsions are broken (abolished), the surface water binding capacity of the colloidal particles is diminished and thus, the collodial emulsion structure of the sludge, which can only be dewatered with difficulties and to a limited extent, is transformed to a dispersion structure which is much easier to dewater. Simultaneously, the microorganisms are killed and their water content is made free; thus, both the capillary and emulsion-bond water content as well as the structural water connected to the bodies of microorganisms are liberated.

Formaldehyde and dimethylolurea are capable of reacting with the active groups of organic contaminants of the sludge, particularly in an alkaline medium. Thus, the sludge should be made alkaline by adding calcium hydroxide (caustic lime, lime milk) or magnesium oxide to a pH value of 9 to 12 before the addition of these chemicals. The use of these agents for alkalinization provides a further advantage: the excess of the alkaline agent forms insoluble salts with the contaminants of the sludge which are capable of salt formation; thus, a considerable part of the soluble substances are also coagulated and/or precipitated. When an adsorbent with a great surface (e.g. swollen perlite, coke grist or coal dust) capable to adsorb oily and fatty substances and thereby to break the remained emulsions is added to the sludge treated in the manner described above, the fats and other suspended contaminants, modified by the chemical treatment, as well as the dissolved materials of high molecular weight are easily adsorbed on said great surface. Thus, the solid particles will be capable of being settled easily and water will not be bound on their surface owing to the more advantageous superficial properties, whereby the separation of the solid particles from the aqueous phase will be facilitated.

This favorable effect of the treatment of sludge with the above-mentioned chemical agents and adsorbent can further be increased by adding also a flocculating agent to the sludge in a manner known in the art. For this purpose several water-soluble nonionic or cationic polymers or electrolyte-type chain polymers or copolymers containing anionic and cationic groups are particularly suitable as flocculating agents; examples of such polymeric or copolymeric flocculating agents are polyacrylamides, polyacrylic acids, acrylamide/acrylic acid copolymers, polymeric products obtained from the reaction of acrylic acids with triethanolamine, sulphate and phosphate salts of hydrolyzed starch derivatives and modified carboxymethylcellulose derivatives.

It can be concluded from the nature of the chemical-physical phenomena described above, which form the basis of the process of the invention, that the favorable conditions of these chemical-physical events should be secured in the course of the process of invention. Thus, the following factors should particularly be considered during the carrying out of the process of the invention:

(1) As mentioned above, the reaction of formaldehyde and/or dimethylolurea with the reactive groups of the organic contaminants favorably proceeds at a pH value of about 9 to 12. This value is preferably adjusted by mixing calcium hydroxide to the sludge. The calcium ions exert a further effect known in the art by forming water-insoluble calcium salts.

(2) After the addition of the additives used in the process of invention (calcium hydroxide, formaldehyde and/or dimethylolurea, adsorbent, flocculating agent) an adequate time period is needed to realize the whole effectiveness of these additives. Thus, the sludge is conditioned by stirring for several, e.g. for 5 to 20, minutes before the next appropriate additive is added, i.e. at the following time-points: after adjusting the pH value; after mixing in the formaldehyde and/or dimethylolurea; and after adding the adsorbent (e.g. perlite, coal dust, etc.).

(3) During and after the addition of the flocculating agents, the intensive stirring and subjecting to any other considerable shearing effect of the sludge would result in the re-breaking of the loosely bound floccules and this irreversible process could only be counterbalanced by adding a further amount of the flocculating agent. Thus, the aqueous solution of the flocculating agent is added portionwise to the sludge treated with the chemical agents and adsorbent under a slow and mild stirring, whereafter neither mixing nor other treatment involving any considerable shearing stress are used, rather the sludge treated in the described manner is allowed to settle. Without a shearing effect, the flocculating agent can also be added in such a way that the sludge is led to a chute and the aqueous solution of the flocculating agent is sprayed onto the sludge slowly slipping downwards in a thin layer.

(4) A further required condition consists in that the chemical agents added to the sludge, namely formaldehyde and/or dimethylolurea as well as the flocculating agent should easily get a contact with the elements of the colloidal emulsion system being present in the sludge. Therefore, the dilution of the sludge should be higher than the so-called compression zone limit. Namely, in systems the concentration of which exceeds said zone limit the dispersed particles of the system are connected together at various sites to give a loosely bound consistent system inhibiting the free movement of the chemicals in the medium, whereby the contact of these chemicals with the superficial molecules is also hindered. The compression zone limit of colloidal systems is at a relatively low dry substance content, that is at 2 to 5%; thus, when the dry material content of the sludge to be treated exceeds this value, it is suitable to dilute the sludge with tap water to a dry material content of 1 to 2%. In general, this dilution may be favorable even before treating the sludge with the chemicals, although the contact of the chemicals with the suspended particles of the sludge is promoted by conditioning with stirring of the treated sludge within this operation. However, it is desired in all cases that the dilution of the sludge be over the compression zone limit on adding the flocculating agent, as the sludge will not further be stirred after this operation for the reasons mentioned above.

Thus, the invention relates to a new process for dewatering municipal and other sewage sludges containing mainly organic materials by treating with chemical agents, which comprises adjusting the pH of the sludge to a value between 9 and 12 by adding at least one of a compound selected from the group consisting of calcium and magnesium hydroxide and calcium and magnesium oxide, then mixing 50 to 5000 g./m$^3$. of formaldehyde and/or dimethylolurea to the sludge suitably in the form of an aqueous solution, then optionally adding a dusty or granular substance capable to adsorb oils and fats in an amount of 0.5 to 15% by weight as calculated for the dry substance content of the sludge, and adding prior to the adjustment of the pH or after the optional treatment with said substance capable of adsorption to the sludge 20 to 500 g./m$^3$. of a flocculating agent, suitably a nonionic or cationic polymer with a molecular weight suitably higher than 100,000, preferably higher than 2 millions to 3 millions, or a copolymeric electrolyte containing anionic and cationic groups, suitably in the form of an aqueous solution of 0.5 to 1% by weight, then letting settle, removing the water from above the sediment and subjecting the sediment to further dewatering in a manner known in the art, suitably by the means of filtration and/or centrifuging.

In the course of the practical embodiment of the process of invention, the stirring aimed to conditioning the treated sludge is preferably continued for 5 to 15 minutes after the individual treating operations, that is after adding the chemical agents and the adsorbent, respectively; the dilution of the sludges having a concentration over the compression zone limit (mostly a dry substance content of 2 to 3%) is carried out before the treatment with the chemical agents or before the addition of the flocculating agent. In the last step of the process, the final dewatering of the settled sludge by a known filtering or centrifuging procedure can be performed e.g. on a common filter sieve, vibrating sieve, disc-type vacuum filter, filter band, filtering container, filter press, settling or filtering centrifuge or in any other equipment useful for this purpose.

The most significant advantages of process of invention for dewatering sludges, as compared to other known processes useful for the same purpose, can be summarized as follows.

The process of invention can be accomplished within a short time period and does not require any special or hardly accessible material or equipment.

The amounts of the chemicals required to the process are relatively low and they are easily available; about a quarter of the flocculating agent is only used as compared to the known flocculating procedures.

The settled sludge can well and rapidly be filtered and the superficial water binding of the sludge particles is very low.

The dewatering proceeds much more rapidly and with a higher efficiency in the last step of the process of invention, in the course of the usually performed filtration or centrifuging, as a consequence of the above-mentioned favorable superficial properties of the solid particles. While the sludges treated with known processes can be dewatered to a remaining water content of 75 to 80% by using a simple filtration, or to 65 to 70% by using filter press even with a filtering performance of 5 to 6 kg./m$^2$× hour, the water content of the sludges treated according to the process of invention can be lowered to 65 to 70% by using common filter sieves, to 60 to 65% by using vacuum filtration and to 45 to 50% by using filter presses. Simultaneously, the filtering performance, depending also on the origin and quality of the sludge, amounts to 3 to 8-fold of the performance achieved on sludges treated in a known manner.

In the case of sludges treated according to the process of invention, the sludge obtained after the final dewatering (filtration, press-filtering or centrifuging, respectively) is solid, form-stable, crumbling or burry, transportable, it can be discarded on dumping places without any danger of the environment or annihilated by burning (its caloric value is 1600 to 2500 kcal./kg.), as opposed to the liquid or at least plastic end product of the known processes, the deposition or annihilation of which represents a serious problem from the view-point of environmental protection.

From the view-point of environmental protection and hygiene a further advantage is that in the process of invention both the settled sludge as well as the water flown off after settling are practically germ-free as a consequence of the disinfecting action of the chemicals used for treating the sludge. Thus, no harmful effects are evoked either from the view-point of hygiene or of the environmental protection.

The process of invention is illustrated in detail by the following Examples which do not limit, however, the scope of the patent protection required.

EXAMPLE 1

One m$^3$. of a household sewage sludge, treated previously by aerobic and anaerobic decomposition, which has a dry substance content of 4% (wherein the dry substance contains about 25% of fats, 50% of proteins and other organic materials and 15% of inorganic materials), a pH value of 7 and a viscosity of 90–100 cP, is diluted to the two-fold volume, that is to a dry substance content of 2%. The sludge is alkalinized to pH 11 by adding lime milk while stirring. After stirring for 15 minutes, 1.5 litres of a 40% aqueous formaldehyde solution are added to the sludge with thorough stirring and the stirring is continued for 15 minutes. Then 2 kg. of swollen perlite are mixed into the sludge in the form of a grist consisting of granules of 0.5 to 3 mm. size and the stirring is continued for 15 minutes. Thereafter, 100 g. of a polyacrylamide-base flocculating agent are added to the sludge as an 0.5% aqueous solution under a mild stirring, then the sludge is let settle without stirring for 30 minutes. The aqueous phase is removed from above the sediment and let flow into the canal, while the sediment is led to the filter sieve wherein it is dehydrated at a reduced pressure of 0.9 atm. The moisture content of the dehydrated sludge residue is 52%, this material is solid and form-stable.

When the same settled sludge is dehydrated in a filter press by using 10 atmospheres, a product with a crumbling consistence and dry touch, containing 45% of moisture is obtained.

EXAMPLE 2

One m$^3$. of a sludge that has been biologically decomposed by aeration but not digested, and which has a dry substance content of 3% (wherein the dry substance contains 16% of fats, 62% of proteins and other organic materials and 22% of inorganic material), a pH value of 6 and a viscosity of 110 cP, is alkalinized to pH 11 by aqueous calcium hydroxide solution, then stirred for 15 minutes and let stand for several minutes. Thereafter, 2 kg. of a 35% aqueous formaldehyde solution are added, the mixture is stirred for 20 minutes, then 5 kg. of coke dust with a granulometric distribution of 1 to 500 microns are mixed to the sludge and the stirring is continued for 15 minutes. The sludge is diluted with water to its 2.5-fold volume and then led through a pipeline equipped with a Venturi tube and guide vanes to a settling tank, while 80 g. of a flocculating agent consisting of a copolymer of acrylamide with an acrylic acid based quaternary compound are added as an 0.5% aqueous solution through the Venturi tube. The sludge treated with the flocculating agent is led into a container having clearer cloth walls, where it is subjected to a dehydration by the force of gravity for 12 hours to give a solid sludge residue with a moisture content of 62%.

When the sludge in the container is pressurized between the sheets of a filter press with 1 atm., a solid, burry product containing 50% of moisture is obtained.

EXAMPLE 3

One m$^3$ of aerated, biologically partially decomposed undigested sludge with 3.5% dry substance content (dry substance composition: 13% of fats, 64% of proteins and polysacchrid based organic materials, 23% inorganic substance) and a pH value of 5.8 was led into a settling tank through a pipeline fitted with static mixers into which 80 g. of cationic flocculant were fed in the form of a 0.5% solution, then subsequently at another point of said pipeline lime hydrate was fed to set the pH value to 10, then further at another point of the pipeline 2.2 kg. of formaldehyde of 35% strength were fed into the sludge. The so treated sludge remained in said settling tank for 15 to 20 minutes. The flocculated part of the dry substance content separated from the water and settled at the bottom of the tank and a large amount of the water water could be discharged as an overflow. Subsequently the thickened underflow was led into vacuum drum filter or centrifuge and dewatered to 30 to 35% dry content or onto a pressure filter where according to local requirement the sludge was dewatered to 50 to 65% dry content as a function of the applied pressure and pressing time.

EXAMPLE 4 (COMPARATIVE EXAMPLE)

(a) 600 g./m$^3$ of ferric chloride and then lime milk in an amount corresponding to 1200 g./m$^3$. of calcium oxide are added to a sludge having a quality according to Example 1 while stirring, according to the known process. After dehydration by using a filter sieve, a product containing 82% of moisture is obtained.

(b) The process described above in (a) is followed with the exception that 300 g./m$^3$. of a flocculating agent (the polyacrylamide used in Example 1) are also added to the sludge treated with the chemical agent. The thus-treated sludge is dehydrated by centrifuging to give a residue containing 80% of moisture. When the dehydration is carried out by using a filter band press, then the moisture content of the dehydrated residue is 73%.

The product with a 80% moisture is semi-liquid, highly viscous, not form-stable; the product with 73% moisture content obtained by using a filter band press has a pasty consistence.

What we claim is:

1. A process for dewatering sewage sludge containing organic materials which comprises the steps of:
   (a) adjusting the pH of the sludge to a value between 9 and 12 by adding at least one compound selected from the group consisting of calcium hydroxide, calcium oxide, magnesium hydroxide and magnesium oxide;
   (b) mixing the sludge treated according to steps (a) with 50 to 5000 g/m$^3$ of formaldehyde;
   (c) adding to the sludge a dusty or granular adsorbent, capable of adsorbing oils and fats, in an amount of 0.5 to 15% by weight as calculated for the dry substance content of the sludge;
   (d) treating the sludge following step (c) with 20 to 500 g/m$^3$ of a polymer flocculating agent having a molecular weight of at least 100,000;
   (e) allowing the sludge to settle;
   (f) removing water from above the settled sludge; and
   (g) further dewatering the sludge.

2. The process defined in claim 1 wherein prior to step (a) the sludge is diluted to a dry substance content of 1 to 2% by weight.

3. The process defined in claim 1 wherein prior to step (d) the sludge is diluted to a dry substance content of 1 to 2% by weight.

4. The process defined in claim 1 wherein subsequent to each of the steps (a), (b), and (c), the sludge is conditioned by stirring for 1 to 20 minutes.

5. The process defined in claim 1 wherein in step (d), a water-soluble acrylamide polymer with a molecular weight of 2 million to 3 million or an acrylamide-acrylic acid copolymer is employed as the flocculating agent.

6. The process defined in claim 1, wherein in step (c) the adsorbent is swollen perlite, coke dust or coal dust.

7. The process defined in claim 1, wherein in step (g), the water content of the dewatered sewage sludge is lowered to 65 to 70% by using a filter sieve.

8. The process defined in claim 1, wherein in step (g) the water content of the dewatered sludge is lowered to 60 to 65% by using vacuum filtration.

9. The process defined in claim 1, wherein in step (g), the water content of the dewatered sludge is lowered to 45 to 50% by using a filter press.

10. The process defined in claim 1, wherein in step (a) the pH of the sludge is adjusted to a value of 10 to 11.

11. A process for dewatering sewage sludge containing organic materials which comprises the steps of:
    (a) treating the sludge with 20 to 500 g/m$^3$ of a polymer flocculating agent having a molecular weight of at least 100,000;
    (b) adjusting the pH of the sludge to a value between 9 and 12 by adding at least one compound selected from the group consisting of calcium hydroxide, calcium oxide, magnesium hydroxide and magnesium oxide;
    (c) mixing the sludge treated according to steps (a) and (b) with 50 to 5000 g/m$^3$ of formaldehyde;
    (d) allowing the sludge to settle;
    (e) removing water from above the settled sludge; and
    (f) further dewatering the sludge.

12. The process defined in claim 11, wherein in step (a), a water-soluble acrylamide polymer with a molecular weight of 2 million to 3 million or an acrylamide-acrylic acid copolymer is employed as the flocculating agent.

13. The process defined in claim 11, wherein in step (f), the water content of the dewatered sewage sludge is lowered to 60 to 65% by using vacuum filtration.

14. The process defined in claim 11, wherein in step (f), the water content of the dewatered sewage sludge is lowered to 65 to 70% by using a filter sieve.

15. The process defined in claim 11, wherein in step (f), the water content of the dewatered sludge is lowered to 45 to 50% by using a filter press.

16. The process defined in claim 11, wherein in step (b) the pH of the sludge is adjusted to a value of 10 to 11.

* * * * *